United States Patent [19]
Koch et al.

[11] 3,809,255
[45] May 7, 1974

[54] WORKPIECE CONVEYOR FOR MULTISTAGE PRESS

[75] Inventors: Friedrich-Karl Koch, Krefeld; Oskar Rahn, Hubert, both of Germany

[73] Assignee: Peltzer & Ehlers, Krefeld, Germany

[22] Filed: Sept. 8, 1972

[21] Appl. No.: 287,521

[30] Foreign Application Priority Data
Sept. 29, 1971 Germany............................ 2148529

[52] U.S. Cl. .......................... 214/1 BD, 214/147 T
[51] Int. Cl. .............................................. B23q 7/04
[58] Field of Search ........... 214/1 BD, 147 T, 1 BC, 214/1 BS

[56] References Cited
UNITED STATES PATENTS
3,247,532  4/1966  Klooz ............................... 214/1 BD

*Primary Examiner*—Albert J. Makay
*Assistant Examiner*—George F. Abraham
*Attorney, Agent, or Firm*—Herbert E. Kidder

[57] ABSTRACT

A conveyor for transporting a workpiece from one die to another in a multistage press, so that successive pressing operations can be performed on the workpiece. Parallel carrier arms corresponding in number to the number of dies, are pivotally supported at one end, and the other end swings between a first position adjacent one die, and a second position adjacent the next successive die. The free ends of the carrier arms are tied together by spring-loaded, extensible link means, so that they swing as one. A rotating double cam acts on diametrically opposite cam followers on two carrier arms, causing the arms to oscillate between the first and second positions. Each carrier arm has a support rail slidably mounted thereon, with gripper jaws at one end to grip the workpiece. A connecting rod joins the other end of each support rail to a cam-actuated lever arm, and when the support rail is at one extreme position, the pivot center between the connecting rod and lever arm coincides with the pivot axis of the carrier arm.

6 Claims, 3 Drawing Figures

WORKPIECE CONVEYOR FOR MULTISTAGE PRESS

SUMMARY OF THE INVENTION

This invention relates to a conveyor apparatus suitable for transporting workpieces from one die to an adjacent die in a multistage press.

An assembly of gripper jaws in a carrier arrangement consisting of a carrier plate has been proposed. The carrier plate is moved substantially linearly backwards and forwards or up and down, depending upon the arrangement of the die. With this assembly it is virtually impossible to eradicate all play. It is however essential that at all times the gripper fingers are moved into a centralized position with respect to the die and therefore stops are provided which limit the degree travel of the carrier plate. This leads to shockloading and heavier wear on the drive elements. With this assembly it is virtually impossible to eradicate all play. With this assembly, it is not possible to achieve rates of operation of the carrier plate of more than between 60 and 120 strokes per minute. The performance of multistage presses is considerably improved if the conveyor apparatus used to transfer workpieces from one die to the next, operates at a higher rate.

According to the present invention there is provided a conveyor apparatus comprising carrier arms pivotally mounted about respective fixed points, links interconnecting the carrier arms support rails for respective carrier arms and mounted for reciprocal motion with respect to the carrier arms, a cam drive cooperating with cam followers each mounted on a respective carrier arm whereby rotation of the cam drive produces a pivotal motion of the arms about the respective pivot points.

Preferably parallel links with a spring arrangement are provided.

Coupling rods may be attached to the ends of the gripper rails adjacent the pivot points, which rods may be articulated to pivotable drive levers. In the forward position of the support rails the points of articulation of the coupling rods to the rails may be arranged to coincide with the fixed pivot points.

The invention will now be described in more detail, by way of example only, with reference to the accompanying diagrammatic drawings.

DESCRIPTION OF THE PREFERRED EMBODIMENT

Figure 1:
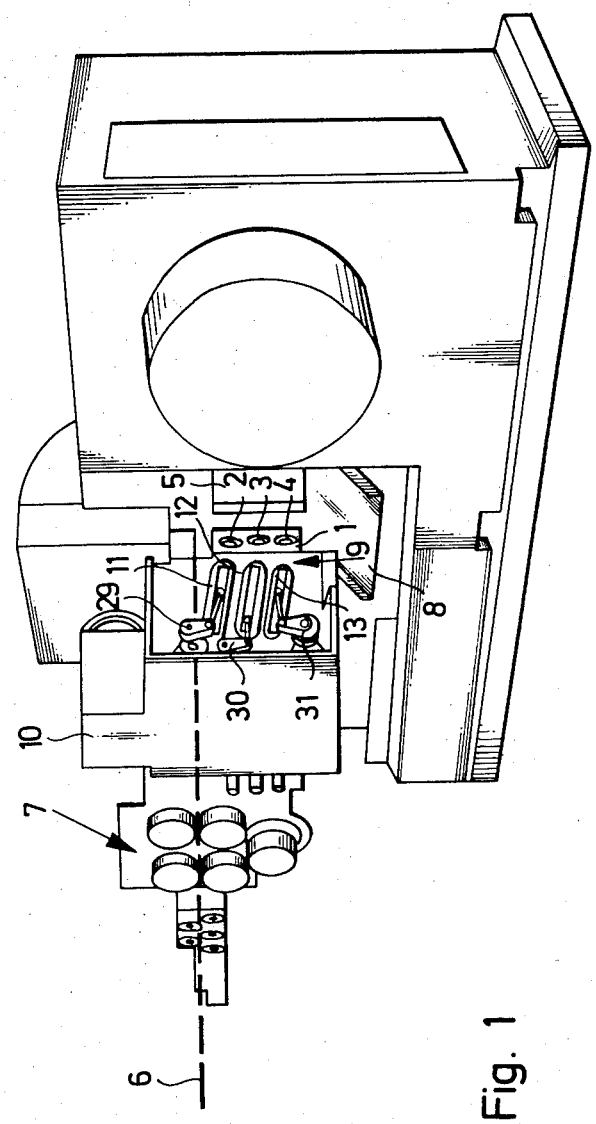
FIG. 1 shows a multistage bolt press with a horizontally guided saddle and a conveyor apparatus acting at one side for the transfer of workpieces from one die to the next.

The multistage bolt press, shown in FIG. 1, has a die block 1 with three dies 2, 3 and 4 arranged one above the other. A press tool saddle 5, which contains the press tool, is arranged opposite the dies 2, 3, 4 and can move move horizontally backwards and forwards with respect to the dies 2, 3, 4. Workpieces which are to be formed in stages in the dies 2, 3, 4 are supplied in the form of wire 6, by a conveyor device 7 and a shearing mechanism (not shown), to the upper die 2. A workpiece passes through the press in stages. After a first pressing operation the semi-manufacture produced in the top press is pushed out of the die 2 by an ejector mechanism (not shown) and then transferred to the next die 3. After the second pressing operation has taken place there, the semimanufacture is transferred from the die 3 to the die 4 and emerges from the press through a chute 8 to form the finished product. To transport the workpieces or pressings from the shearing device to the first die and then from one die to the next die, the conveyor apparatus shown in FIG. 1 is provided and attached to a transfer housing 10 and is shown in more detail in FIG. 2.

Figure 2:
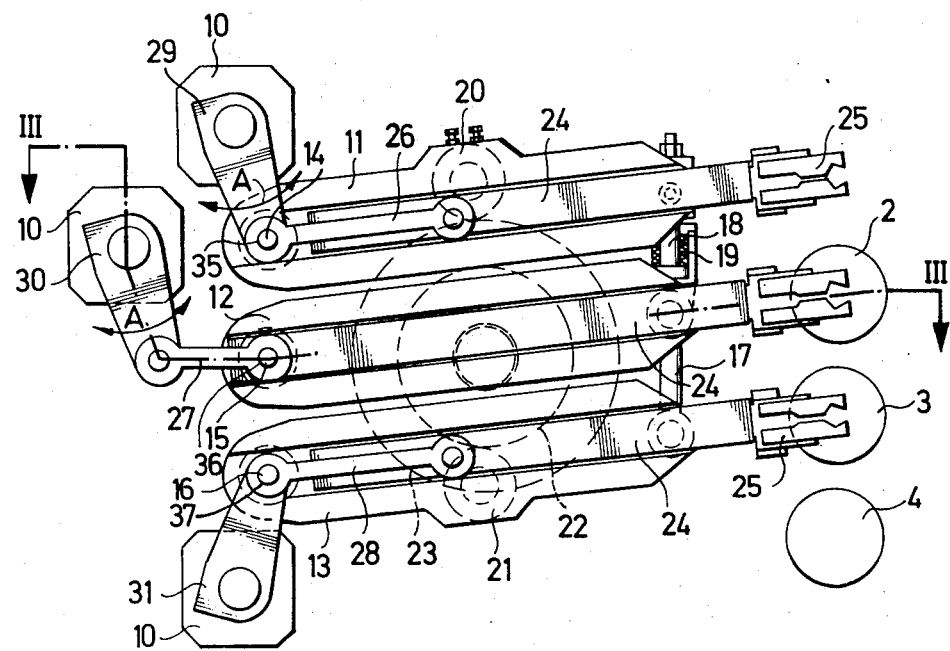
FIG. 2 shows a front elevation of the conveyor apparatus on an enlarged scale.

The conveyor apparatus comprises carrier arms 11, 12, 13 arranged one above the other and articulated at respective points 14, 15 and 16, to the transfer housing 10. The carrier arms are also attached to one another through parallel links 17 and 18. A spring mechanism 19 is provided in the parallel links. Rollers 20 and 21 are rotatably fitted on the respective carrier arms 11 and 13. The rollers 20 and 21 are followers which cooperate with double cams 22 and 23 of a cam drive arrangement 23'. The cams 22 and 23 are schematically illustrated in FIG. 2 as circles, although this is not their true profile. The cams are arranged to counter-rotate so that the carrier arms pivot about the pivot points 14, 15 and 16, when the cam drive rotates.

Figure 3:
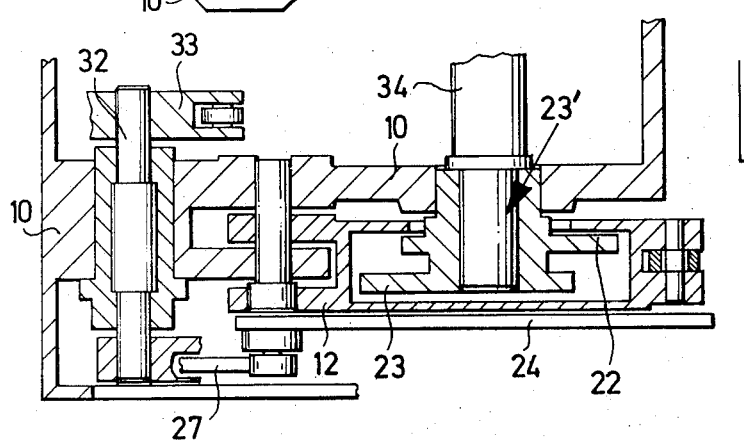
FIG. 3 is a section on the line III—III of FIG. 2.

Gripper rails 24 are displaceably arranged in the longitudinal direction of the carrier levers 11, 12 and 13. Support rails provided by gripper rails 24 are provided at their free ends with gripper jaws 25. The other ends of the gripper rails 24 are connected to coupling rods 26, 27 and 28, which in turn engage drive arms 29, 30 and 31. The drive arms 29, 30, 31 are driven backwards and forwards in the direction of the arrow A by an arrangement (not shown) provided for that purpose. The gripper rails and therefore the gripper jaws are moved backwards and forwards rythmically inside the carrier arms. The drive to the drive arms 29, 30 and 31, as shown in FIG. 3, is effected in each case through shafts 32, which, through transmission levers 33, are operated by a cam drive system (not shown). The drive shaft for the cam drive 23 is marked 34.

The forward position of the gripper rails and therefore also of the gripper jaws 5, is shown in FIG. 2. In this forward position, the gripper jaws 25, is they are cooperating with the dies 2 and 3, are located precisely above the centers of the dies 2 and 3. The fulcrum points 14, 15 and 16 of the carrier arms 11, 12 and 13 are coincident with the points of articulation 35, 36 and 37 of the coupling rods 26, 27 and 28 to the gripper rails 24.

When the cam drive arrangement 23' is rotated, the carrier arms 11, 12 and 13 execute an oscillatory motion. The carrier arms 11, 12, 13 first pivot downwards, from the position shown in FIG. 2, until the gripper jaws 25 have been lowered. In this position, the gripper rail 24, with the jaws 25, is level with the die 4 and the remaining gripper jaws are level with the dies 3 and 2. The motion of the gripper rails is produced by conventional means.

In the apparatus described, gripper rails with gripper jaws arranged at their ends, are displaceably assembled in a carrier arrangment fitted to the transfer housing. The carrier arrangement is reciprocable transversely of the direction of displacement of the gripper so that the workpiece can be transferred by the gripper jaws from one die to the adjacent die.

The described conveyor apparatus allows a substantial improvement in the number of strokes per unit time, compared with known conveyor apparatuses.

The described apparatus has the advantage that through the parallel-oscillating carrier arms, in comparison with the case of the straight line motion of a carrier plate, substantially smaller inertia forces are experienced so that consequently higher working rates can be achieved. Also, the stops which have been provided previously can be dispensed with because through the direct coupling of the double cam with the carrier arms, a drive mechanism which is largely free of any backlash is obtained. Because the carrier arms are inter-connected through parallel links, it is merely necessary to arrange for the cam drive to engage two carrier arms because the pivoting motion is transmitted from these arms, through the parallel links, to the other carrier arms.

Furthermore there is substantially no relative motion of the gripper rails during the pivoting movement of the carrier arms so that unreliable transfer with the possibility of the workpieces falling out of the gripper jaws is substantially avoided.

While we have shown and described in considerable detail what be believe to be the preferred form of our invention, it will be understood by those skilled in the art that the device may take various other forms within the scope of the following claims.

In the claims:

1. A conveyor apparatus comprising carrier arms pivotally mounted about respective fixed points, links interconnecting the carrier arms, support rails for respective carrier arms mounted on said carrier arms for reciprocal motion with respect thereto, said support rails having free ends provided with respective jaws for gripping objects to be conveyed, and the support rails being articulated at their ends adjacent the pivot points to respective connecting rods, the arrangement being such that when the support rails are in one end position, the points of articulation of the connecting rods coincide with the fixed points, and a rotatable cam cooperating with cam followers, each mounted on a respective carrier whereby rotation of the cam produces a pivotal motion of the arms about the respective pivot points.

2. An apparatus as in claim 1, wherein the connecting rods are articulated to respective pivotable lever arms.

3. A conveyor apparatus as in claim 1, wherein the carrier arms are arranged alongside and parallel to one another; the two outermost carrier arms having cam followers mounted thereon; and said rotatable cam is disposed between said cam followers, said cam acting against one of said followers to move said carrier arms in one direction, and against the other follower to move said carrier arms in the other direction.

4. A conveyor apparatus as in claim 3, wherein said cam is a double cam, one of which acts against one of said cam followers, and the other acts against the other cam follower.

5. A conveyor apparatus as in claim 4, wherein said carrier arms are connected together by a link so that they move as one.

6. A conveyor apparatus as in claim 5, wherein said link interconnecting said carrier arms is provided with a spring mechanism, so as to be elastically extendable.

* * * * *